(12) United States Patent
Koganti et al.

(10) Patent No.: US 11,687,927 B2
(45) Date of Patent: Jun. 27, 2023

(54) CONNECTED DEVICE TRANSACTION CODE SYSTEM

(71) Applicant: Visa International Service Association, San Francisco, CA (US)

(72) Inventors: Krishna Prasad Koganti, Cupertino, CA (US); Mark Douglas McGee, San Francisco, CA (US); David Tseselsky, San Jose, CA (US); Brendan Xavier Louis, Tracy, CA (US)

(73) Assignee: Visa International Service Association, San Francisco, CA (US)

( * ) Notice: Subject to any disclaimer, the term of this patent is extended or adjusted under 35 U.S.C. 154(b) by 207 days.

(21) Appl. No.: 17/339,888

(22) Filed: Jun. 4, 2021

(65) Prior Publication Data
US 2021/0295317 A1    Sep. 23, 2021

Related U.S. Application Data

(63) Continuation of application No. 16/432,742, filed on Jun. 5, 2019, now Pat. No. 11,074,578, which is a
(Continued)

(51) Int. Cl.
*G06Q 20/38* (2012.01)
*G06Q 20/32* (2012.01)

(52) U.S. Cl.
CPC ......... *G06Q 20/385* (2013.01); *G06Q 20/322* (2013.01); *G06Q 20/38215* (2013.01)

(58) Field of Classification Search
CPC ............... G06Q 20/385; G06Q 20/322; G06Q 20/38215
(Continued)

(56) References Cited

U.S. PATENT DOCUMENTS 7,319,987 B1    1/2008    Hoffman et al.
7,349,871 B2    3/2008    Labrou et al.
(Continued)

FOREIGN PATENT DOCUMENTS

CN    101742469 A    6/2010
CN    101958817 A    1/2011
(Continued)

OTHER PUBLICATIONS

Hopkins, "Cell Phones Seen as Emerging Payment Device", Supermarket News 56.34: NA. Penton Media, Inc., Prenton Business Media, Inc and their subsidiaries, Aug. 25 . (Year: 2008).*
(Continued)

*Primary Examiner* — Frantzy Poinvil
(74) *Attorney, Agent, or Firm* — Kilpatrick Townsend & Stockton LLP

(57) ABSTRACT

Described herein are systems and methods in which more secure methods are provided for a connected device to conduct transactions. In accordance with embodiments of the disclosure, a transaction code is generated and provided to the connected device. The transaction code may be stored in association with the information for the transaction such that when the transaction code is received at a transaction processing server, the transaction processing server is configured to generate an authorization request that includes the transaction information. The authorization request may then be routed to an authorization server associated with an account maintained by the transaction processing server.

20 Claims, 5 Drawing Sheets

Related U.S. Application Data continuation of application No. 15/222,767, filed on Jul. 28, 2016, now Pat. No. 10,366,389.

(58) Field of Classification Search
USPC .................................................. 705/3–44
See application file for complete search history.

(56) References Cited

U.S. PATENT DOCUMENTS

| | | | |
|---|---|---|---|
| 7,707,117 B1* | 4/2010 | Jimenez | G06Q 20/38 705/64 |
| 7,801,826 B2 | 9/2010 | Labrou et al. | |
| 7,857,212 B1 | 12/2010 | Matthews | |
| 7,957,212 B2 | 6/2011 | Kang et al. | |
| 8,121,945 B2 | 2/2012 | Rackley, III et al. | |
| 8,170,953 B1* | 5/2012 | Tullis | G06Q 20/4016 705/77 |
| 8,224,753 B2* | 7/2012 | Atef | G06F 21/34 705/64 |
| 8,244,643 B2 | 8/2012 | Coulter et al. | |
| 8,280,776 B2 | 10/2012 | Coulter et al. | |
| 8,352,376 B2* | 1/2013 | Yuen | G06Q 20/40 902/4 |
| 8,355,987 B2 | 1/2013 | Hirson et al. | |
| 8,370,955 B2 | 2/2013 | Proctor, Jr. et al. | |
| 8,412,626 B2 | 4/2013 | Hirson et al. | |
| 8,583,496 B2 | 11/2013 | Yoo et al. | |
| 8,596,547 B2 | 12/2013 | Diamond | |
| 8,606,712 B2 | 12/2013 | Choudhuri et al. | |
| 8,650,622 B2 | 2/2014 | Murakami et al. | |
| 8,762,268 B2 | 6/2014 | Wall et al. | |
| 8,840,016 B1 | 9/2014 | Schott et al. | |
| 10,366,389 B2 | 7/2019 | Koganti et al. | |
| 2003/0055738 A1 | 3/2003 | Alie | |
| 2006/0212407 A1 | 9/2006 | Lyon | |
| 2007/0152048 A1 | 7/2007 | Jung et al. | |
| 2007/0255653 A1 | 11/2007 | Tumminaro et al. | |
| 2011/0066550 A1* | 3/2011 | Shank | G06Q 20/327 701/469 |
| 2012/0239577 A1 | 9/2012 | Wolfs et al. | |
| 2012/0303531 A1 | 11/2012 | Betancourt | |
| 2013/0066782 A1 | 3/2013 | Diamond | |
| 2013/0238455 A1 | 9/2013 | Laracey | |
| 2013/0246203 A1 | 9/2013 | Laracey | |
| 2013/0262303 A1 | 10/2013 | Metral | |
| 2013/0297387 A1 | 11/2013 | Michael | |
| 2014/0006131 A1 | 1/2014 | Causey et al. | |
| 2014/0046848 A1 | 2/2014 | Radu et al. | |
| 2014/0058862 A1 | 2/2014 | Celkonas | |
| 2014/0195428 A1 | 7/2014 | Ghetler | |
| 2014/0279479 A1 | 9/2014 | Maniar et al. | |
| 2014/0379578 A1 | 12/2014 | Chan et al. | |
| 2015/0032626 A1 | 1/2015 | Dill et al. | |
| 2015/0120472 A1 | 4/2015 | Aabye et al. | |
| 2015/0154634 A1 | 6/2015 | Chiu et al. | |
| 2015/0310431 A1* | 10/2015 | Lakshmanan | G06Q 20/02 705/71 |
| 2015/0348173 A1 | 12/2015 | Gillen | |
| 2016/0012431 A1 | 1/2016 | Proctor, Jr. et al. | |
| 2016/0034891 A1 | 2/2016 | Carpenter et al. | |
| 2016/0034892 A1 | 2/2016 | Carpenter et al. | |
| 2016/0086169 A1 | 3/2016 | Jodoin et al. | |
| 2016/0117683 A1 | 4/2016 | Jung et al. | |
| 2016/0140526 A1 | 5/2016 | Cummins et al. | |
| 2017/0061430 A1* | 3/2017 | Matthews | G06Q 30/0215 |
| 2017/0236118 A1 | 8/2017 | Laracey | |
| 2018/0025442 A1 | 1/2018 | Isaacson et al. | |
| 2018/0033003 A1 | 2/2018 | Koganti et al. | |
| 2020/0380490 A1* | 12/2020 | Jayachandran | G07G 1/0009 |

FOREIGN PATENT DOCUMENTS

| | | |
|---|---|---|
| CN | 102568108 A | 7/2012 |
| CN | 102568181 A | 7/2012 |
| CN | 102598037 A | 7/2012 |
| CN | 202711450 U | 1/2013 |
| CN | 103164818 A | 6/2013 |
| CN | 104867012 A | 8/2015 |
| WO | 2018022345 A1 | 2/2018 |

OTHER PUBLICATIONS

Alhothaily et al., "QuickCash: Secure Transfer Payment Systems", MDPI, Basel, Switzerland, Apr. 10 . (Year: 2017).*
CN201780046480.7 , "Office Action", dated Nov. 30, 2022, 24 pages.
"HSBC Enhances Card Security for Online Transactions", Gulf News, Apr. 11, 2015.
U.S. Appl. No. 15/222,767 , "Non-Final Office Action", dated Sep. 13, 2018, 8 pages.
U.S. Appl. No. 15/222,767 , "Notice of Allowance", dated Mar. 27, 2019, 8 pages.
U.S. Appl. No. 15/222,767 , "Restriction Requirement", dated May 3, 2018, 9 pages.
U.S. Appl. No. 16/432,742 , "Non-Final Office Action", dated Oct. 1, 2020, 8 pages.
U.S. Appl. No. 16/432,742 , "Notice of Allowance", dated Mar. 5, 2021, 10 pages.
EP17834971.8 , "Extended European Search Report", dated Jun. 13, 2019, 7 pages.
EP17834971.8 , "Office Action", dated Mar. 9, 2021, 8 pages.
PCT/US2017/042409 , "International Preliminary Report on Patentability", dated Feb. 7, 2019, 10 pages.
PCT/US2017/042409 , "International Search Report and Written Opinion", dated Oct. 24, 2017, 13 pages.
Valimo , "Valimo Selected by Gemalto as Global Mobile Authentication Vendor—Global Reseller Agreement Makes Mobile ID Available to Everyone", M2 Presswire; Coventry, Proquest ID: 444156883, Sep. 9, 2009.

* cited by examiner

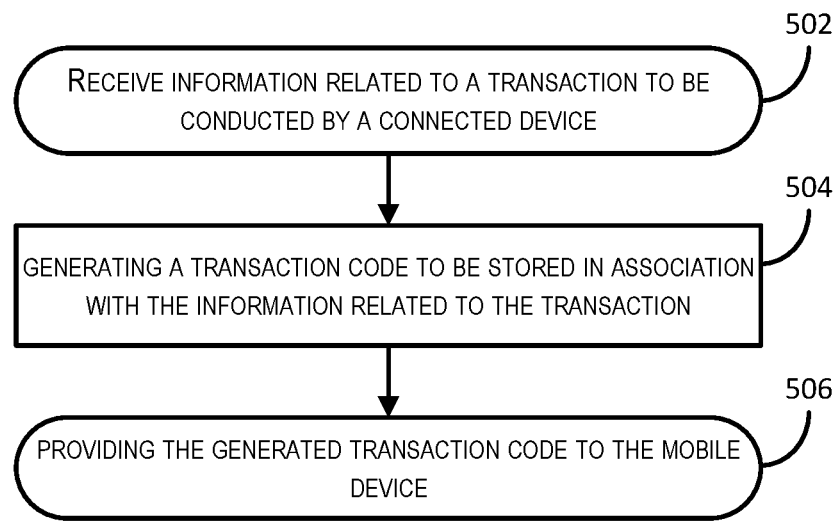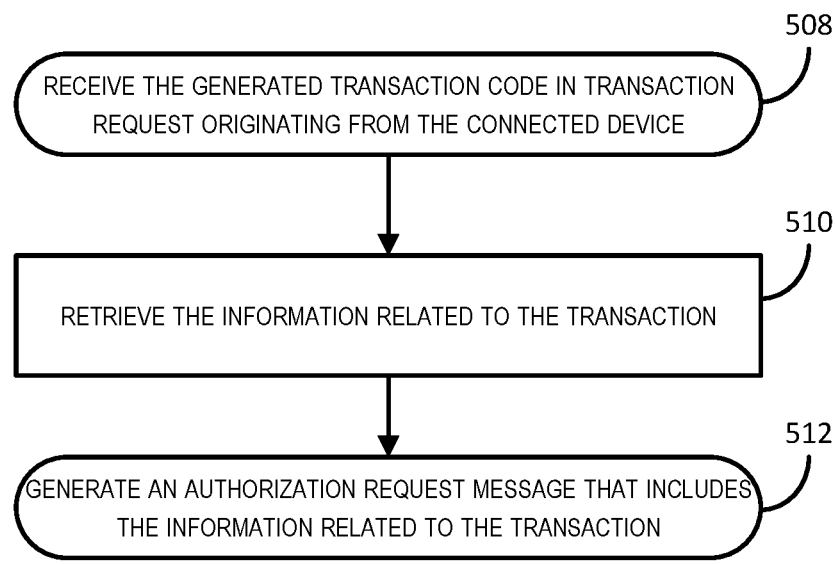
FIG. 5

CONNECTED DEVICE TRANSACTION CODE SYSTEM

This patent application is a continuation of U.S. application Ser. No. 16/432,742, filed Jun. 5, 2019, now U.S. Pat. No. 11,074,578, which is a continuation of U.S. application Ser. No. 15/222,767 filed Jul. 28, 2016, now U.S. Pat. No. 10,366,389, all of which are hereby incorporated by reference in their entirety.

BACKGROUND

Households typically include a number of connected devices and these connected devices have needs to access resources such as goods, services, and data. For example, consumers have refrigerators for storing food, gas meters for measuring gas usage, electric meters for measuring power usage, and water meters for measuring water usage. Recently, "smart" versions of some of these connected devices have been introduced to the public. It has been contemplated that such smart connected devices could be capable of automatically requesting resources such as software updates, goods or services. However, each time a connected device initiates a transaction (usually over a wireless area network) there is a chance that details of the transaction (including payment account information or other access credentials) and/or sensitive credential information associated with the connected device may be intercepted and the owner of the device may be defrauded. Given the proliferation of network enabled connected devices, it is difficult to provide data security to each and every interaction between each and every connected device within system.

Additionally, smart devices are often limited in the amount of information that they may process and/or transmit. Furthermore, simple smart devices are often not capable of optimizing resource selection. For example, even if a smart device is able to identify its needs (i.e., a resource that needs to be replaced), it may not be able to effectively select an appropriate replenishment/replacement resource to meet those needs.

Embodiments of the invention address these and other problems, individually and collectively.

BRIEF SUMMARY

Embodiments of the invention are directed to a system in which a mobile device may receive a request to conduct a transaction from a connected device. A transaction code is generated to be associated with transaction information such that the transaction code may be used by the connected device to complete the transaction. In some embodiments, the transaction code may be generated by the mobile device itself and the transaction information (and transaction code) may be provided to a transaction processing server by the mobile device. In some embodiments, the transaction code may be generated by a transaction processing server and stored in association with the transaction information.

Upon receiving the transaction code in a first authorization request, the transaction processing server may retrieve the stored transaction information and may subsequently generate a second authorization request message to be provided to an appropriate authorization computer. Embodiments of the disclosure enable a connected device to conduct a transaction without communicating sensitive information.

One embodiment of the invention is directed to a method performed by a server device that comprises receiving, from a mobile device at a transaction processing network, information related to a transaction to be conducted by a connected device, the information related to the transaction including at least an identifier for a resource provider of the transaction, generating a transaction code to be stored in association with the information related to the transaction, and providing the generated transaction code to the mobile device, wherein the generated transaction code is provided to the connected device by the mobile device. The method further comprises retrieving the information related to the transaction upon receiving the generated transaction code in transaction request originating from the connected device, and generating an authorization request message that includes the information related to the transaction.

Another embodiment of the invention is directed to a transaction processing server comprising one or more processors, and a memory including instructions that, when executed by the one or more processors, cause the transaction processing server to receive transaction information associated with a transaction requested by a connected device, the transaction information including at least an indication of a resource provider with which the transaction should be conducted. The instructions may further cause the transaction processing server to generate a transaction code associated with the transaction information and provide the transaction code to the mobile device in response to receiving the transaction information. The instructions may further cause the transaction processing server to upon receiving the transaction code in a first authorization request message: retrieve the transaction information, generate a second authorization request message based at least in part on the retrieved transaction information, and route the second authorization request message to an appropriate authorization computer.

Another embodiment of the invention is directed to a mobile device comprising one or more processors, and a memory including instructions that, when executed by the one or more processors, cause the mobile device to receive, from a connected device, a request to conduct a transaction, the request including an indication of a resource related to a primary function of the connected device. The instructions may further cause the mobile device to generate a transaction code to be used in completing the transaction, provide the transaction code to a transaction processing server to be stored in association with transaction information, and provide the transaction code to the connected device such that the connected device conveys the transaction code to a provider of the resource, and the provider of the resource conveys the transaction code to the transaction server for authorization of the transaction, the transaction being authorized based upon the transaction information.

These and other embodiments of the invention are described in further detail below.

BRIEF DESCRIPTION OF THE DRAWINGS

FIG. 5 depicts a flow diagram illustrating a process for generating a resource provider specific transaction code in accordance with at least some embodiments.

DETAILED DESCRIPTION

Figure 1:
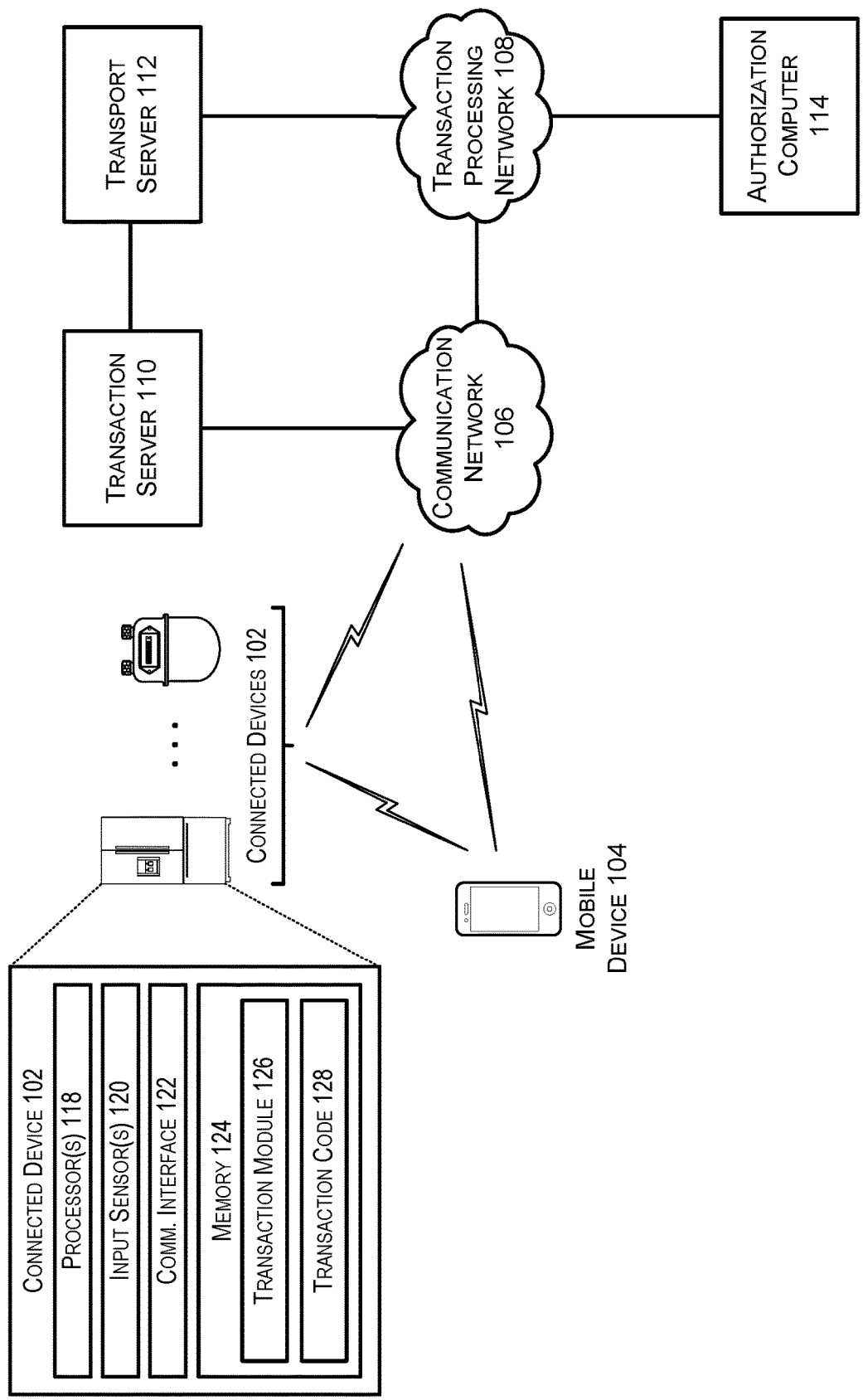
FIG. 1 depicts an example system architecture capable of implementing at least some embodiments of the current disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

An "access credential" may be any data or portion of data used to gain access to a particular resource. In some embodiments, an access credential may be a login and/or password for a user account. In some embodiments, an access credential may be include account information or a token associated with the account information, a cryptogram, a digital certificate, etc. A mobile device may store one or more access credentials associated with each connected device. In some embodiments, an access credential stored in association with a connected device may be used to conduct transactions on behalf of the connected device. In some embodiments, the mobile device may store a single access credential that may be used in each transaction initiated by the mobile device.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "communication device" may be any electronic device that has a primary function related to communication. A communication device may be capable of establishing a communication session with another electronic device and transmitting/receiving data from that device. In some embodiments, a communication device may act as a proxy device between two or more other electronic devices by establishing communication sessions with each of the devices and relaying information between the devices. A mobile device may be a type of communication device.

A "connected device" may be any suitable electronic device capable of communicating with, and/or interacting with other devices. A connected device may have a primary function that is unrelated to communicating with other electronic devices. For example, a connected device may be a refrigerator that, in addition to preserving food, is capable of interacting with one or more other electronic devices. In some embodiments, a connected device may be associated with a device identifier. The device identifier may be used by a service provider to determine the type of device for a particular connected device. Examples of connected devices may include gas and electric meters, refrigerators, lamps, thermostats, printers, automobiles, fire alarms, home medical devices, home alarms, motorcycles, boats, televisions, etc. A connected device need not be "connected" at all times, as the term connected is intended to refer to devices with the ability to establish a connection with another device.

A "device identifier" may include any suitable distinctive set of characters used to identify a device. An exemplary device identifier may include any suitable number or type of characters (e.g., numbers, graphics, symbols, or other information) that may uniquely represent a device. By way of example, a device identifier may be a serial number, partial serial number, or device name or nickname. In some embodiments, a device identifier may be generated, based on a trusted hardware root. Additionally, the device identifier may be a temporary identifier for a particular device, such as a network address at which the device may be found.

An "electronic device," may be any device that accomplishes its purpose electronically. An electronic device may have multiple functions. For example an electronic device may have a primary function and one or more secondary functions. A primary function may be the function that most closely aligns with the electronic device's purpose. An example of an electronic device may be a connected device.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer.

A "merchant" may typically be an entity that engages in transactions and can sell goods or services, or provide access to goods or services.

A "mobile device" may be any computing device capable of traveling with a user. In some embodiments, a mobile device can include any suitable computing device configured to establish communication sessions with one or more electronic devices (including connected devices) and/or a transaction server (either directly or via a processing server). In some embodiments, the mobile device may store one or more account details to be used in these transactions. In some embodiments, the mobile device may be configured to store one or more protocol sets related to transactions and/or connected devices. The mobile device may be further configured to confirm that transactions are in compliance with these transaction protocols prior to initiating the transactions.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "transaction" may be any interaction or exchange between two or more parties. For example, a transaction may include a first entity requesting resources from a second entity. In this example, the transaction is completed when the resources are either provided to the first entity or the transaction is declined.

A "transaction server" may include any computing device capable of receiving a request for a transaction and processing information related to the requested transaction. In some embodiments, the transaction server may be affiliated with an electronic marketplace or a retail entity that maintains an internet presence. A transaction server may support transactions to acquire resources (e.g., goods and/or services). In some embodiments, a user may request a transaction by visiting a website affiliated with the transaction server and selecting one or more items to purchase. The transaction server may be in communication with other devices via a network connection.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

Details of some embodiments of the present invention will now be described.

FIG. 1 depicts an example system architecture capable of implementing at least some embodiments of the current disclosure. In FIG. 1, one or more connected devices 102 may be in communication with a mobile device 104. The connected devices 102 may be located within a vicinity of the mobile device 104. For example, the connected devices 102 may be within range of a short range communication means used by the mobile device 104. In some embodiments, the range may be less than about 100, 50, 20, 10, or 5 yards. In some embodiments, the connected devices 102 may be connected to a communication network 106. For example, the connected devices 102 may each be in communication with a private or public communication network.

In some embodiments, the mobile device 104 may be in communication with a transaction processing network 108 via a communication network 106. The transaction processing network 108 and/or the mobile device 104 may also be in communication with a transaction server 110 configured to receive and process transaction requests and/or a transport server 112 configured to communicate with the transaction server 110 and generate and/or route authorization request messages. Upon receiving a transaction request, the transport server 112 may generate and submit an authorization request message to the transaction processing network 108 to be routed to, and subsequently authorized by, an authorization computer 114.

The connected device 102 may include one or more processors 118 capable of processing user input. The connected device 102 may also include one or more input sensors 120 for collecting input. In some embodiments, the input may include user provided input. Some non-limiting examples of input sensors 120 that may be included in a connected device include keyboards, mice, microphones, cameras, motion sensors, accelerometers, cameras, pressure sensors, thermometers, a global positioning system (GPS), etc. In some embodiments, the input may include input related to resource usage. For example, the connected device may be a water meter configured to capture input related to water usage at a particular location. In another example, the connected device may be an electricity meter configured to capture input related to electricity usage at a particular location.

In some embodiments, the connected device 102 may include a communication interface 122 configured to enable communication between the connected device 102 and another electronic device (e.g., mobile device 104, or a wireless router that manages access to communication network 106). Examples of communication interface 122 may include one or more radio frequency (RF) transceivers configured to send and receive communications using near-field communications (NFC), or other radio frequency or wireless communication protocols such as Bluetooth, Bluetooth low-energy (BLE), a wireless local area network (e.g., WiFi), iBeacon, etc. In some embodiments, communication interface 122 may include an infrared communication device. In some embodiments, the communication interface 122 may include both long range and short range communication means. For example, the communication interface may include an antenna configured to connect to a cellular network in order to enable communication with various other components of the depicted architecture.

In some embodiments, the communication technology used by the connected device 102 and/or the mobile device 104 may depend on the type of power source used by the connected device. For example, if the device has access to a regular, external power supply (e.g., as is common for smart refrigerators and other devices such as washer/driers, garage doors, cars, etc.) it may include a WiFi interface. Alternatively, if the device relies on a battery instead of an external power supply, it may include a means for communication that consumes less power, such as low power Bluetooth interface, a ZigBee interface, a near field communication (NFC) or radio frequency (RF) interface, or any other suitable wireless access interface.

Embodiments of one or more modules on the connected device 102 may be stored and executed from its memory 124. Turning to the contents of the memory 124 in more detail, the memory 124 may include an operating system and one or more modules configured to cause the processors 118 to carry out instructions in accordance with at least some embodiments of the disclosure. For example, the memory 124 may include a transaction module 126 configured to work with the processor 118 to initiate one or more transactions related to the primary function of the connected device 102. Additionally, the memory 124 may include information necessary to complete a transaction (e.g., transaction code 128).

In some embodiments, the transaction module 126 may be programmed to cause the connected device 102 to initiate a transaction on behalf of an owner and/or operator of the connected device 102. For example, the transaction module 126 may be configured to cause the connected device 102 to initiate a purchase of a resource on behalf of the user. The resource may be any good or service related to a primary function of the electronic device. In particular, the resource may be one that is consumed during operation of the connected device 102. For example, a water purifier may initiate a purchase order for new water filters upon determining that the current water filters need replacement. The transaction module 126 may be programmed to cause the connected device 102 to provide one or more transaction details to the mobile device 104. For example, upon detecting that a mobile device 104 is present (e.g., the mobile device 104 may connect to a private network or directly to the connected device 102), the transaction module 126 may provide transaction details to the mobile device 104 in order to receive a transaction code 128 to be used to complete the transaction.

The memory 124 of connected device 102 may include a secure execution environment such as a secure memory (e.g., Smartcard based technology available in low-power devices). In some embodiments, the secure memory may include a secure element. A secure element (SE) can be a tamper-resistant platform (typically a one chip secure microcontroller) capable of securely hosting applications and their confidential and cryptographic data (e.g. key management) in accordance with the rules and security requirements set forth by a set of well-identified trusted authorities. Sensitive information (e.g., a transaction code 128 or other sensitive data such as token information, etc.) provisioned onto the connected device 102 may be stored in the secure memory.

In at least some embodiments of the invention, a mobile device 104 may be configured to detect local connected devices 102. For example, the mobile device 104 may be configured to perform a device discovery action that identifies all communicatively enabled electronic devices within range of the mobile device 104. By way of illustration, a mobile device 104 may detect all electronic devices that are connected to WiFi within range of the mobile device 104. In another example, the mobile device 104 may connect to a private network (e.g., a home-based or business-based network) and may identify each of the connected devices 102 that are also connected to the private network. Once detected, the mobile device 104 may receive a selection of at least one of the connected devices from a user. In some embodiments of the disclosure, the mobile device 104 may establish a connection with the selected connected device 102 and receive information related to that connected device (e.g., a device identifier). In some embodiments, an additional step of authenticating that a user owns the connected device may be required by the mobile device 104 in order to establish a connection. For example, the user may be required to enter a password for the connected device or press a button located on the connected device 102. Information related to the connected device may be presented to a user within a graphical user interface (GUI) executed from the mobile device 104. In some embodiments, the mobile device 104 may authenticate the connected device 102 by use of a shared secret or digital signature. For example, upon encountering a new connected device 102, the mobile device 104 may, upon determining that the connected device 102 is authorized to perform transactions on behalf of a user of the mobile device 104 (e.g., by confirming shared ownership by the user as described above), provide an encryption key and/or passcode to the connected device 102. Upon establishing a communication session with the mobile device 104 in the future, the connected device 102 may authenticate itself by providing the passcode to the mobile device 104.

The mobile device 104 may also establish a connection with a transaction processing network 108. In some embodiments, the transaction processing network 108 may provide back-end support for a mobile application installed on, and executed from, the mobile device 104 that manages transaction-related activities. In some embodiments, upon receiving transaction information from the connected device 102, the mobile device 104 may transmit that transaction information to the transaction processing network 108. The transaction processing network 108 may generate a transaction code 128 to be stored in association with that transaction information and with the connected device and may send that transaction code 128 to the mobile device 104, which may subsequently forward the transaction code 128 to the connected device 102. In this way, the transaction code 128 may be provisioned onto the connected device 102 for use in a particular transaction. The transaction information may include a consumer identifier, a resource identifier, a resource provider identifier, pricing information, shipping information and/or any other suitable information relevant to a transaction to be conducted.

In some examples, the communication network 106 and/or the transaction processing network 108 may include any one or a combination of many different types of networks, such as cable networks, the Internet, wireless networks, cellular networks, and other private and/or public networks. In addition, the communication network 106 and/or transaction processing network 108 may comprise multiple different networks. For example, the mobile device 104 may utilize a 3G network to communicate with a wireless router, which may then route the communication over a public network (e.g., the Internet) to the transaction processing network 108. In some embodiments, the transaction processing network 108 may be an electronic payment network (e.g., VisaNet). Additionally, it should be noted that in some embodiments, the transaction processing network 108 may be embodied by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

Transaction server 110 may be any computing device or plurality of computing devices configured to receive a transaction request and initiate a transaction. In some embodiments, the transaction server 110 may be associated with an electronic commerce site or other resource provider. For example, the transaction server 110 may maintain a catalog of items and/or services available for purchase. The transaction server may also be associated with a utility company or other resource provider. In some embodiments, the transaction server may enable a user to pay a bill or other outstanding debt related to resource acquisition. The transaction server 110 may also be configured to complete a transaction upon receiving an authorization response message indicating that a transaction has been approved.

In some embodiments, the transaction server 110 may be in communication with a transport server 112. A transport server 112 may be any computing device or plurality of computing devices configured to process transaction information received from the transaction server 110 and generate and/or route an authorization request message to be transmitted to the authorization computer 114. In some embodiments, the transport server 112 may be owned and/or operated by a banking institution (e.g., an acquirer) with which the operator of the transaction server 110 maintains an account.

Authorization computer 114 may be any computing device or plurality of computing devices configured to receive an authorization request message for a transaction, authorize or decline the transaction, and provide an authorization response message based on whether the transaction has been authorized or declined. The authorization computer 114 may determine whether to authorize or decline the transaction based on information associated with the transaction. In some embodiments, the authorization computer 114 may be an authorization entity affiliated with an access credential (e.g., an issuer of a credit card).

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications policy. In at least some embodiments, each component of the depicted architecture may represent one or more special purpose devices configured to perform the described functions. In some embodiments, each component of the depicted architecture may comprise a cluster or group of devices that each perform the same, or a similar, function.

Figure 2:
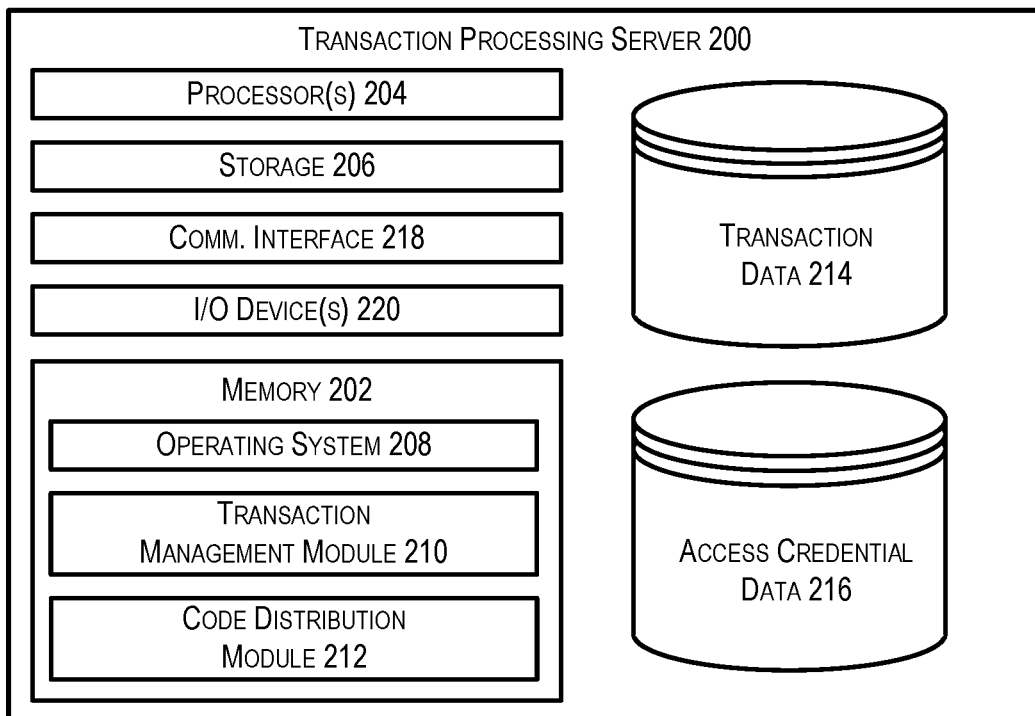
FIG. 2 depicts an example transaction processing server configured to manage transaction information and associated transaction codes in accordance with at least some embodiments.

FIG. 2 depicts an example transaction processing server configured to manage transaction information and associated transaction codes in accordance with at least some embodiments. The transaction processing server 200 may be configured to receive transaction related information and generate a transaction code to be maintained in relation to the transaction related information. The transaction processing server 200 may also be configured to, upon receiving the transaction code in a first authorization request message, generate a second authorization request message that includes the transaction information. The depicted transaction processing server 200 may be implemented as the transaction processing network 108 of FIG. 1.

The transaction processing server 200 may be any type of computing device capable of managing transaction information and associated transaction codes. In some embodiments, the transaction processing server 200 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these program instructions. Depending on the configuration and type of transaction processing server 200, the memory 202 may be volatile (such as random access memory (RAM)) and/or non-volatile (such as read-only memory (ROM), flash memory, etc.). The transaction processing server 200 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the mobile device. In some embodiments, the memory 202 may include multiple different types of memory, such as static random access memory (SRAM), dynamic random access memory (DRAM) or ROM.

Turning to the contents of the memory 202 in more detail, the memory 202 may include an operating system 208 and one or more application programs or services for implementing the features disclosed herein including at least a module for managing authorization request generation and routing associated with a transaction code (transaction management module 210) and/or a module for generating and/or distributing transaction codes in accordance with transaction data (code distribution module 212). The memory 202 may also include transaction data 214, which provides mappings between transaction codes and transaction information and access credential data 216, which provides information on access credentials for one or more connected devices.

In some embodiments, the transaction management module 210 may, in conjunction with the processor 204, be configured to receive a first authorization request message from a transport server, identify a transaction code included in the first authorization request message, map the identified transaction code to transaction information for a specific transaction, and generate a second authorization request message that includes the identified transaction information. To do this, the transaction management module 210 may identify a transaction code and verification information (e.g., a device identifier for a connected device that initiated the transaction) from the first authorization request message. The transaction processing server 200 may then query a database of transaction data 214 based on the identified transaction code to retrieve the relevant transaction data. The retrieved transaction data may then be used to generate a second authorization request message. In some embodiments, the retrieved transaction data may include an access credential or an identifier for an issuer to which the second authorization request message is to be routed. In some embodiments, the retrieved transaction data may include information on a resource, resource provider, cost of resource acquisition (e.g., a price of the resource) or any other suitable transaction-related data.

In some embodiments, the code distribution module 212 may, in conjunction with the processor 204, be configured to receive transaction information from a mobile device, generate a transaction code to be maintained in association with the received transaction information, and provide the generated transaction code to the mobile device. In some embodiments, the transaction code may be random or otherwise unassociated with the underlying transaction information. In some embodiments, the transaction code may be generated from the underlying transaction information. For example, a format of the transaction code may be chosen based on the transaction information.

The transaction processing server 200 may also contain communications interface(s) 218 that enable the transaction processing server 200 to communicate with a stored database, another computing device or server, one or more terminal devices, connected devices, and/or other electronic devices on a network. The transaction processing server 200 may also include input/output (I/O) device(s) and/or ports 220, such as for enabling connection with a keyboard, a mouse, a pen, a voice input device, a touch input device, a display, speakers, a printer, etc.

Figure 3:
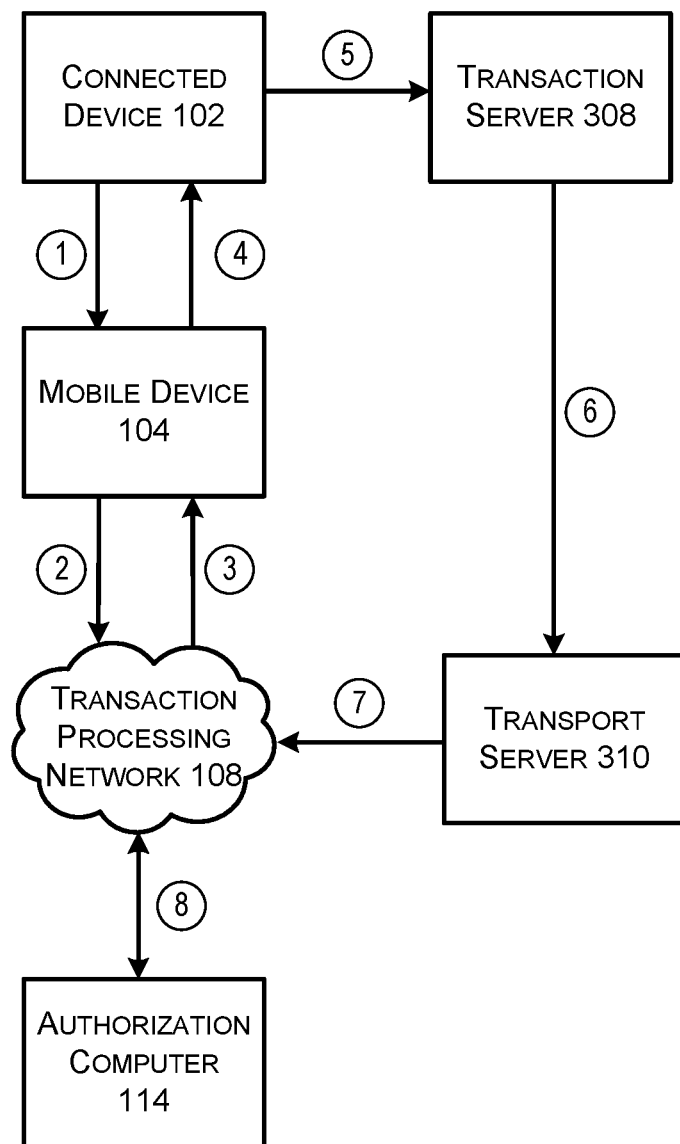
FIG. 3 depicts an illustrative data flow in depicting a process for generating, and completing a transaction using, a transaction code in accordance with at least some embodiments.

FIG. 3 depicts an illustrative data flow in depicting a process for generating, and completing a transaction using, a transaction code in accordance with at least some embodiments. In some embodiments, the process 300 may be implemented using the system architecture depicted in FIG. 1.

At step 1 of the process 300, a connected device 102 may determine that a transaction is to be completed. For example, the connected device 102 may detect that one or more conditions, upon which a transaction should be completed, have been satisfied, and may subsequently attempt to initiate the transaction. For example, a smart dog food dispenser (an example connected device) may, using sensors attached to the dog food dispenser (e.g., a weight sensor) determine that the amount of dog food stored in the dispenser is now below a minimum threshold level. Upon making this determination, the dog food dispenser may initiate an order for more dog food. To do this, the dog food dispenser may attempt to establish a communication session with a mobile device associated with the user of the dog food dispenser to get permission from that user to order more dog food. In some embodiments, the connected device 102 may maintain mobile device information associated with the user. In some embodiments, the connected device 102 may identify a mobile device 104 connected to a private network that the connected device 102 is also connected to.

In some embodiments, conditions upon which a transaction should be initiated by a connected device 102 may be specified by a user of the connected device 102. For example, in some embodiments, a user may log in or otherwise access the connected device and may provision configuration settings onto the connected device 102. For example, the user may establish a communication session between the connected device 102 and a mobile device 104 operated by the user. In this example, the mobile device 104 may include an application that, when executed, allows the user to communicate preferences and/or transaction conditions via the established communication session. The user may provide an indication of a resource for which a transaction should be conducted (e.g., a good or brand of good), a resource provider with which the transaction should be provided (e.g., a merchant from which a good should be purchased), conditions upon which the resource should be replenished, or any other suitable user-specific settings.

In some embodiments, the connected device 102 may compile a transaction request to be provided to the mobile device 104 that includes a variety of transaction-related information. In some examples, the connected device 102 may simply provide a replenishment indicator to the mobile device (e.g., an indication that a replenishment needs to be made by the connected device). In these examples, the mobile device may identify resource information to be provided to the user in response to the replenishment indicator. For example, upon receiving a replenishment indicator from a water filter device, an application on the mobile device 104 may conduct a search for merchants that provide water filter replacements compatible with the water filter. The user may then be provided with a list of options that conveys a number of resource providers (e.g., merchants), water filter brands, availability, and/or prices. The user may then select the option that he or she would like to authorize for a subsequent transaction.

At step 2, the mobile device 104 may transmit information related to the transaction to the transaction processing network 108. In some embodiments, the information may be transmitted upon receiving approval for the transaction from a user of the mobile device 104. Once the transaction information is received, the transaction processing network 108 may query a database of user information to retrieve additional information related to the user of the mobile device 104. For example, the user of the mobile device 104 may maintain an account with the transaction processing network 108 that may include user-specific information. In some embodiments, the user account maintained by the transaction processing network 108 may include access credentials such as a primary account number (PAN) or a payment token. In some embodiments, multiple access credentials may be stored in association with a user and the transaction processing network 108 may identify the most appropriate access credential to be used based on conditions indicated by the user (e.g., an indication of what payment accounts are to be used in each situation). Once the transaction processing network 108 has identified any information relevant to the transaction, the transaction processing network 108 may store that information and generate a transaction code to be associated with the information. This process will be described in greater detail with respect to FIG. 4 below.

In some embodiments, the mobile device may generate a transaction code based on the received transaction information. In these embodiments, the mobile device may provide the generated transaction code to the transaction server. In order to maintain uniqueness, transaction codes generated by the mobile device may include a mobile device identifier or other unique string of characters.

At step 3, the transaction code may be provided to the mobile device 104. The mobile device 104 may subsequently forward the transaction code to the connected device 102 at step 4. Upon receiving the transaction code in response to the transaction request that it transmitted to the mobile device 104, the connected device 102 may initiate the transaction from the request. In some embodiments, this may comprise identifying a transaction server 308 to be associated with the transaction. For example, the connected device 102 may identify a resource provider that is to provide a resource related to the transaction. The connected device 102 may then identify a transaction server 308 associated with that resource provider (e.g., via a lookup table) that a transaction request should be routed to. In some embodiments, the response received by the connected device 102 from the mobile device 104 may include an indication of a transaction server 308 to be provided with the transaction request. For example, the response may include a uniform resource locator (URL) or other network address.

At step 5, the connected device may transmit the transaction request to the identified transaction server 308. At a minimum, the transaction request includes the transaction code provided to the connected device 102. In some embodiments, the transaction request may include only the transaction code and no other information. In some embodiments, the transaction server 308 may note a device identifier associated with the connected device 102 (e.g., for verification purposes). In some embodiments, a device identifier associated with the connected device 102 may be included in the transaction request. In some embodiments, the connected device may convey transaction details such as a resource related to the transaction and/or terms of the transaction. The transaction server 308 may determine an availability of the resource prior to commencing with the process 300. For example, if none of the resource is available, then the transaction server 308 may respond to the transaction request with an indication that the transaction cannot be completed. In some embodiments, the transaction request may not include any indication of the resource related to the transaction.

At step 6, the transaction server 308 may forward at least a portion of the transaction information from the transaction request to the transport server 310 to get approval/details for the transaction. For example, information related to the transaction request may be forwarded to a server operated by an acquirer associated with the resource provider. The transport server 310 may generate and/or route a first authorization request to be routed to an issuer for approval.

At step 7, the first authorization request may be provided to the transaction processing network 108. The first authorization request may include, at a minimum, the transaction code provided to the connected device 102. In some embodiments, the first authorization request may also include verification information such as the device identifier or other suitable transaction-specific data. Upon receiving the first authorization request, the transaction processing network 108 may generate a second authorization request to be provided to an authorization computer 114. This process will be described in greater detail with respect to FIG. 4 below.

At step 8, the transaction processing network 108 may transmit the second authorization request message to the appropriate authorization computer 114 (e.g., the issuer associated with a payment account used in the transaction). The authorization computer 114 may generate an authorization response message to be routed to the transport server 310 that indicates whether the transaction is to be approved or declined.

By way of illustrative example of the above process, consider a scenario in which a smart refrigerator (the connected device 102) determines that an amount of available beer is below a minimum threshold amount of beer set by an owner of the smart refrigerator. In this example, the smart refrigerator may determine that more beer should be ordered. Based on this determination, the smart refrigerator may transmit a message to a mobile device associated with the owner of the smart refrigerator requesting permission to replenish the supply of beer. The owner may be presented, via a graphical user interface on the mobile device, with various options for replenishing the beer (e.g., brands of beer available, merchants from which that beer may be available, and pricing for the available beer). Once the owner has selected an option and granted permission to replenish the beer, the owner's selection is sent to the transaction processing network, which subsequently stores all of the information related to the selection in association with a transaction code. In this example, the owner's credit card information may be identified and stored along with the information as well.

Continuing with the above example, the transaction processing network may transmit the transaction code to the mobile device, which may subsequently forward the transaction code to the smart refrigerator. The mobile device may also provide an indication of the owner's beer selections to the smart refrigerator. Upon receiving the transaction code, the smart refrigerator may generate a transaction request that includes the transaction code (and potentially the owner's selections) to a transaction server 308 capable of completing the transaction. In some cases, the transaction server 308 may be a server owned and/or operated by a merchant that sells the beer selected by the owner. The merchant server may then initiate the transaction using the transaction code as a payment mechanism by contacting an acquirer computer which would subsequently generate an authorization request message. Once the authorization request message is received with the transaction code as the payment mechanism, the transaction processing network may identify the actual payment information associated with the user as well as specific transaction related details. The transaction processing network may then generate a new authorization request message with the stored information and route it to the issuer of the actual payment information. Once approved, an approval message may be relayed to the transaction server 308, so that it may collect payment and ship the requested beer to the owner.

Figure 4:
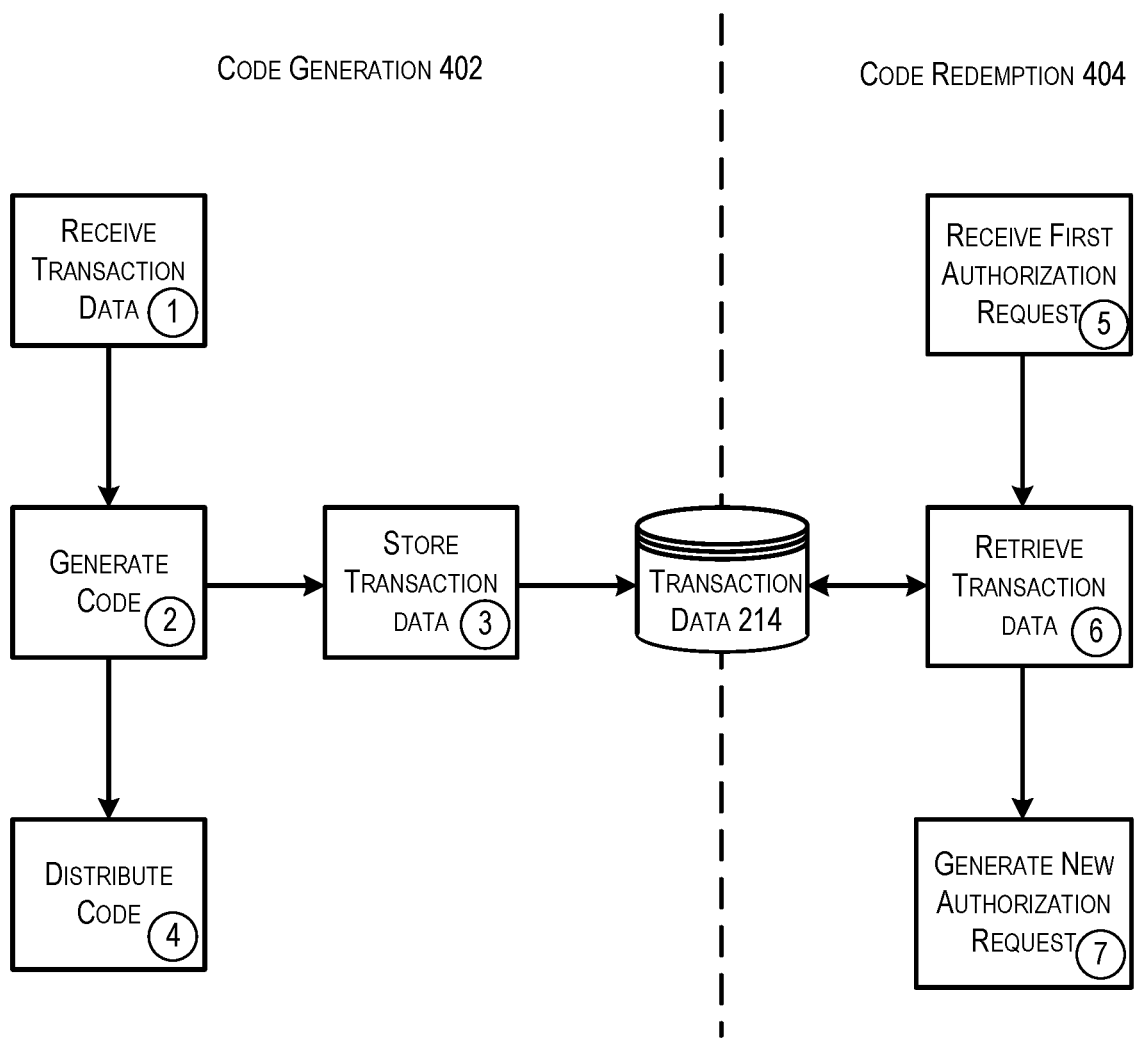
FIG. 4 depicts an example process for generating and distributing a transaction code as well as, upon receiving the transaction code in a first authorization request, generating a second authorization request in accordance with at least some embodiments.

FIG. 4 depicts an example process for generating and distributing a transaction code as well as, upon receiving the transaction code in a first authorization request, generating a second authorization request in accordance with at least some embodiments. Process 400 may be performed by an example transaction server 200 depicted in FIG. 2. As depicted in FIG. 4, process 400 may comprise a code generation phase 402 and a code redemption phase 404.

During the code generation phase 402, the transaction processing server may receive transaction data at step 1 in a request for a transaction code. Transaction data may be received from a mobile device. In some embodiments, the transaction processing server may maintain account information for a plurality of users and/or access credentials that includes a mobile device identifier (e.g., a phone number, an international mobile station equipment identifier (IMEI), a mobile device serial number, or any other suitable identifier associated with a mobile device). Upon receiving transaction data from a mobile device, the transaction processing server may identify the account based on the received mobile device identifier. Once the account has been identified by the transaction processing server, additional information related to the mobile device may also be identified. For example, the transaction processing server may identify access credential information (e.g., a payment account) to be used in completing the requested transaction.

At step 2 of process 40, the transaction processing server may generate a transaction code to be associated with the received transaction information. In some embodiments, the transaction code may be random or otherwise unrelated to the content of the transaction information. In some embodiments, the transaction code may be generated from the transaction information, such that at least one detail of the transaction may be determined based on the format and/or text included in the transaction code. In some embodiments, the mobile device may have installed upon it a mobile application from which the request is received. In at least some of these embodiments, the user of the mobile device may be required to log into an account. The account may be determined based on the user's login.

At step 3 of process 400, the transaction processing server stores the transaction information in relation to the generated transaction code. For example, the transaction information may be stored in a relational database (e.g., transaction data 214 depicted in FIG. 2) with a column that includes the transaction code. In some embodiments, the transaction processing server may generate an authorization request message based on the transaction information to be routed to an issuer of an access credential associated with the account.

At step 4 of process 400, the transaction processing server responds to the request for the transaction code by distributing the transaction code to the mobile device from which the request was received. In at least some embodiments, the transaction code may be encrypted according to an encryption protocol used by the transaction processing server and its associated mobile applications. The transaction code, once provided to the mobile device, may subsequently be provided to the connected device from which the transaction request was received. Upon receiving the transaction code, the connected device may use it to complete the requested transaction.

The transaction processing server may be configured to receive authorization request messages from transport servers and route those messages to an appropriate issuer for authorization. During the code redemption phase 404, the transaction processing server may receive an authorization request message that includes the transaction code at step 5. In some embodiments, the authorization request message may include information other than the transaction code. For example, the authorization request message may include an indication of a resource or an amount to be associated with the transaction. In some embodiments, the authorization request message may include a device identifier or any other suitable indication of an originator of a transaction request. In some embodiments, the authorization request message may include only the transaction code.

Upon determining that the transaction code is associated with transaction information (e.g., based on a format of the transaction code), the transaction processing server may retrieve the transaction information stored in relation to the transaction code at step 6. For example, the transaction processing server may query a transaction data store 214 to identify transaction information associated with the transaction code. In this example, the transaction processing server may identify a number of transaction data that may be used to complete the transaction.

Once the transaction processing server has identified transaction information to be associated with the transaction code, the transaction processing server may generate a new authorization request message at step 7. The new authorization request may include some or all of the transaction information stored at the transaction processing server and may be routed to an authorization computer associated with the transaction information. Upon receiving an authorization response message to the new authorization request message, the transaction processing server may forward the response to the transport server that it received the authorization request message from, or it may generate a new authorization response message to be provided to the transport server with a portion of the information from the original authorization response message.

By way of illustrative example, consider the following scenarios in which embodiments of the disclosure may be implemented. In a first scenario, the connected device may be a vehicle capable of establishing a communication session with a nearby mobile device. In this scenario, the owner of the vehicle may wish to have the vehicle wirelessly pay for parking. A processing device installed within the vehicle, upon detecting that the vehicle has come to a stop and is within the vicinity of a smart parking meter, may initiate a transaction to pay for parking by establishing a communication session with a mobile device of the vehicle's driver. In this scenario, the vehicle may send a request to the mobile device to conduct a transaction for parking with the detected parking meter. The mobile device may present the option to the user of the mobile device (via the GUI) to pay for parking. If the user of the mobile device elects to pay for parking, then the mobile device may forward details of the parking transaction (along with any user elections, such as an amount of parking to purchase, etc.) to the transaction processing server to receive a transaction code. The transaction processing server would then generate a transaction code for the specified parking transaction, and store the transaction details in a database in relation to the transaction code. The transaction code may then be forwarded to the mobile device, which may subsequently forward the transaction code to the vehicle. In this scenario, the vehicle may provide the transaction code to the parking meter to complete the transaction for parking.

Continuing with this example, the parking meter may contact an acquirer (an example transport server) with which it is affiliated to gain authorization of the parking transaction. In this scenario, the acquirer would generate an authorization request message to be routed to an issuer via the transaction processing network. Upon receiving the authorization request message at the transaction processing network, the transaction processing server would identify the transaction code within the authorization request message, identify the transaction details that were previously provided by the mobile device, and generate a new authorization request message in accordance with that information, which would subsequently be routed to an authorization computer associated with the user's payment device. In this scenario, once the authorization response is received, it may be routed to the acquirer, which may notify the parking meter that the parking fare is paid. In this way, the vehicle is prevented from communicating transaction details and/or access credential (e.g., payment information) to the parking meter, which prevents it from being intercepted by unauthorized parties.

By way of a second illustrative example, a smart refrigerator (an example connected device) may detect that a food item (an example resource) is running low. In this example, upon detecting that the refrigerator's owner is nearby (e.g., via a wireless signal of the mobile device), the refrigerator may transmit a message (e.g., a text message, short messaging service (SMS) message, or any other suitable communicative message) to the mobile device. In this scenario, the message may be presented to the user of the mobile device and may request permission to purchase more of the food item. In this scenario, the refrigerator may send an identifier of the food item to the mobile device and the mobile device may identify a number of vendors, brands, prices, or other suitable options for acquiring the food item. If the user elects to allow the refrigerator to purchase more of the food item, then the mobile device may send the user's elections to a transaction processing network. The transaction processing network may then store the transaction information along with a generated transaction code. The transaction code may be provided to the refrigerator via the mobile device such that it may complete the transaction using that code. In this way, the refrigerator is not made to store any sensitive information. In some embodiments, the transaction code may be a one-time use code. In some embodiments, the transaction code may be used by the refrigerator each time that the refrigerator replenishes the food item.

FIG. 5 depicts a flow diagram illustrating a process for generating a resource provider specific transaction code in accordance with at least some embodiments. Some or all of any of the processes described herein (or variations and/or combinations thereof) may be performed under the control of one or more computer systems configured with executable instructions and may be implemented as code (e.g., executable instructions, one or more computer programs or one or more applications). In accordance with at least one embodiment, the process 500 of FIG. 5 may be performed by at least the system architecture depicted in FIG. 1. In particular, the process 500 may be implemented on the transaction processing server 200 of FIG. 2. The code may be stored on a computer-readable storage medium, for example, in the form of a computer program including a plurality of instructions executable by one or more processors. The computer-readable storage medium may be non-transitory.

Process 500 may begin at 502, when a transaction processing server receives information related to a transaction to be conducted by a connected device. The received information may be provided by a mobile device in communication with the connected device. The received information may include a number of transaction-related details. For example, the transaction information may include an identifier associated with a resource provider, an identifier for a resource, an amount of the transaction, or any other suitable transaction-related information. In some embodiments, the transaction information may include (instead of an amount associated with the transaction) a maximum cost or maximum amount to be charged to a payment device (or other suitable access credential) during completion of the transaction.

At 504, the transaction processing server may generate a transaction code to be stored in association with the information related to the transaction. In some embodiments, the transaction code may be a random series of characters. In some embodiments, the transaction code may be generated based on the transaction-related information. The transaction information may be stored in a relational database. For example, the transaction processing server may create a new entry in a table that corresponds to the received data. In some embodiments, the generated transaction code may be stored as a value in a field associated with the new entry. In some embodiments, the generated transaction code may be stored in a separate table that may be linked to the relational database (e.g., via a primary key).

At 506, the transaction processing server may provide the generated transaction code to the mobile device. In some embodiments, the transaction processing server may provide the transaction code to the mobile device via the already-established communication session. In some embodiments, the transaction processing server may provide the transaction code to the mobile device via a push notification.

At 508, the transaction processing server may receive the generated transaction code in transaction request originating from the connected device. For example, the connected device may initiate a transaction for a resource with a transaction server that manages access to that resource. In this example, the transaction server may forward the transaction code, along with information related to the transaction (e.g., an indication of a resource to be accessed, etc.) to a transport server, which may subsequently generate an authorization request message to be provided to the transaction processing server.

At 510, the transaction processing server may retrieve the information related to the transaction. For example, upon detecting the transaction code within a received authorization request message, the transaction processing server may query the database of transaction data to identify the transaction information associated with the transaction code.

At 512, the transaction processing server may generate an authorization request message that includes the information related to the transaction. For example, the transaction processing server may identify a number of transaction details that have been provided via the mobile device. The transaction processing server may generate a new authorization request message that includes those transaction details as well as at least a portion of transaction information received in the first authorization request message. In some embodiments, the transaction processing server may identify an access credential to be associated with the transaction, add the access credential to the new authorization request, and route the new authorization request message to an authorization computer associated with that access credential.

A computer system can include a plurality of the same components or subsystems, e.g., connected together by external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Embodiments of the invention provide for a number of technical advantages. For example, embodiments of the invention enable a connected device to conduct a transaction via a wireless communication without transmitting sensitive data. For example, the connected device may request permission to conduct the transaction from a mobile device associated with its owner. In this example, the mobile device would forward the details of the transaction to a transaction processing server, which may then associate the transaction information with an access credential. Because the connected device is provided with only a transaction code, there is no sensitive information (e.g., access credential information) stored on the connected device, nor is sensitive information transmitted by the connected device. This provides for a system which is more secure and private than current systems. Implementations of the disclosure are virtually immune to man-in-the middle attacks.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of policies, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A transaction processing server comprising:
one or more processors; and
a memory including instructions that, when executed by the one or more processors, cause the transaction processing server to:
receive, from a mobile device, transaction information associated with a transaction requested by a connected device, the transaction information including at least an indication of a resource provider with which the transaction is conducted;
generate a transaction code associated with the transaction information;
provide the transaction code to the mobile device in response to receiving the transaction information; and
upon receiving the transaction code in a first authorization request message:
retrieve the transaction information;
generate a second authorization request message based at least in part on the retrieved transaction information; and
route the second authorization request message to an appropriate authorization computer.

2. The transaction processing server of claim 1, wherein the transaction information includes a maximum cost and the second authorization request message is generated to include a resource cost included in the first authorization request message upon determining that the resource cost is less than or equal to the maximum cost.

3. The transaction processing server of claim 1, wherein the transaction code is provided to the mobile device via a push notification.

4. The transaction processing server of claim 1, wherein generating the transaction code associated with the transaction information comprises creating an entry in a transaction database that includes the received transaction information and the transaction code.

5. The transaction processing server of claim 4, wherein retrieving the transaction information comprises querying the transaction database based on the received transaction code.

6. The transaction processing server of claim 1, wherein the transaction code is configured to be useable only by the connected device.

7. The transaction processing server of claim 1, wherein the transaction information includes a device identifier associated with the connected device and the instructions further cause the transaction processing server to confirm that the first authorization request message includes the device identifier prior to generating the second authorization request message.

8. The transaction processing server of claim 1, wherein the connected device initiates the transaction by generating the first authorization request message that includes an indication of a resource and the transaction code.

9. The transaction processing server of claim 1, wherein the connected device has a primary function unrelated to communicating with other electronic device.

10. The transaction processing server of claim 1, wherein the transaction information comprises a device identifier, which is a serial number.

11. A method comprising:
receiving, from a mobile device, transaction information associated with a transaction requested by a connected device, the transaction information including at least an indication of a resource provider with which the transaction is conducted;
generating a transaction code associated with the transaction information;
providing the transaction code to the mobile device in response to receiving the transaction information; and
upon receiving the transaction code in a first authorization request message:
retrieving the transaction information;
generating a second authorization request message based at least in part on the retrieved transaction information; and
routing the second authorization request message to an appropriate authorization computer.

12. The method of claim 11, wherein the first authorization request message includes only the transaction code.

13. The method of claim 11, wherein the transaction information includes at least one of an indication of a resource, an indication of an amount of currency to be conveyed, or a device identifier associated with the connected device.

14. The method of claim 11, further comprising:
upon generating the transaction code, identifying an access credential associated with the mobile device; and
storing the access credential in association with the transaction information, wherein the second authorization request message is generated to include the access credential.

15. The method of claim 14, wherein the transaction code is provided to the mobile device via a push notification.

16. The method of claim 15, wherein the access credential associated with the mobile device is identified by a user of the mobile device.

17. The method of claim 11, wherein generating the transaction code comprises creating an entry in a transaction database that includes the received transaction information and the transaction code.

18. The method of claim 11, wherein retrieving the transaction information comprises querying a transaction database based on the received transaction code.

19. The method of claim 11, wherein the transaction code is configured to be useable only by the connected device.

20. The method of claim 11, wherein the transaction information includes a device identifier associated with the connected device and the method further comprises confirming that the first authorization request message includes the device identifier prior to generating the second authorization request message.

* * * * *